(12) United States Patent
Berns et al.

(10) Patent No.: US 6,698,860 B2
(45) Date of Patent: Mar. 2, 2004

(54) SPECTRAL COLOR REPRODUCTION WITH SIX COLOR OUTPUT

(75) Inventors: Roy S. Berns, Pittsford, NY (US); Lawrence A. Taplin, Rochester, NY (US); Tony Z. Liang, Sewell, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/282,460

(22) Filed: Oct. 29, 2002

(65) Prior Publication Data

US 2003/0098896 A1 May 29, 2003

Related U.S. Application Data

(60) Provisional application No. 60/339,865, filed on Nov. 1, 2001.

(51) Int. Cl.[7] ................................. B41J 2/205

(52) U.S. Cl. ..................... 347/15; 358/1.9; 358/518

(58) Field of Search ................ 347/15, 43; 358/1.9, 358/502, 518, 515, 519, 537

(56) References Cited

U.S. PATENT DOCUMENTS

| | | | |
|---|---|---|---|
| 5,563,724 A | 10/1996 | Boll et al. | |
| 5,579,031 A | 11/1996 | Liang | |
| 5,596,510 A | 1/1997 | Boenke | |
| 5,612,902 A | 3/1997 | Stokes | |
| 5,786,908 A | 7/1998 | Liang | |
| 6,585,353 B1 * | 7/2003 | Kanematsu et al. | 347/43 |

FOREIGN PATENT DOCUMENTS

| | | |
|---|---|---|
| EP | 0 622 952 A1 | 11/1994 |
| EP | 1 139 654 A2 | 10/2001 |
| EP | 1 146 726 A1 | 10/2001 |

OTHER PUBLICATIONS

D. R. Wyble and Roy S. Berns, "A Critical Review of Spectral Models Applied to Binary Color Printing", Color Research and Application, (Feb. 2000), pp. 4–19, 25–1, John Wiley & Sons, Inc., New York.
Roy S. Berns, "Chapter 4 Measuring Color Quality", Billmeyer and Saltzman's Principles of Color Technology, Third Edition, (2000), pp. 114–121, Joh Wiley & Sons, Inc., New York.
W. Hock and K. Schittkowski, "A Comparative Performance Evaluation of 27 Nonlinear Programming Codes", Computing, (1983), pp. 335–358, 30, the Davidson–Fletcher–Powell (DFP) algorithm.
Vrhel, et al., "Measurement and Analysis of Object Reflectance Spectra", Color Research and Application, (1994), pp. 4–9, 19–1, John Wiley & Sons, Inc.
Hugh S. Fairman, "Metameric Correction Using Parameric Decomposition", Color Research and Application, (1987), pp. 261–265, 12–5, John Wiley & Sons, Inc.
Lawrence A. Taplin and Roy S. Berns, "Spectral Color Reproduction Based on a Six–Color Inkjet Output System", 5 pages, Munsell Color Science Laboratory, Rochester Institute of Technology, Rochester, New York.
Copy of International Search Report (PCT/US02/ 36416) dated Jan. 11, 2002.
Richard P. Brent, "A new algorithm for minimizing a function of several variables without calculating derivatives", Algorithms for Minimization Without Derivatives, (1973), pp. 116–120, Prentice–Hall, Inc., Englewood Cliffs, New Jersey.

* cited by examiner

Primary Examiner—Lamson D Nguyen
(74) Attorney, Agent, or Firm—Bart E. Lerman

(57) ABSTRACT

The present invention provides a method to fully utilize the spectral gamut of a six-color printer to minimize metameric matches while maintaining high colorimetric accuracy in the reproduction by such six-color printer of a target image from a target color device.

7 Claims, 1 Drawing Sheet

SPECTRAL COLOR REPRODUCTION WITH SIX COLOR OUTPUT

CROSS-REFERENCE TO RELATED APPLICATION

This application claims priority under 35 U.S.C. §119 from U.S. Provisional Application Serial No. 60/339,865 (filed Nov. 1, 2001), which is incorporated by reference herein as if fully set forth.

BACKGROUND OF THE INVENTION

This invention pertains to color reproduction, in particular to color reproduction by a six-color ink jet printer.

Inkjet printers are being increasingly used for proofing and short-run production (e.g. fine art reproduction, textile). For example, in the textile area inkjet printers are being utilized for short "pre-production" runs, which short runs are not cost effective for typical higher volume rotary screen printers due to the time and expense in cutting screens.

As such it is desirable to have the output of the inkjet printer be faithful to the original in all light, to all observers. In the particularly case of short "pre-production" runs, it is highly desirable that the output of the inkjet printer be as identical as possible in appearance to output from a rotary screen printer, regardless of observation conditions.

Color matching/conversion systems correlating the outputs of various types of devices are known. See U.S. Pat. No. 5,579,031, which is incorporated by reference herein for all purposes as if fully set forth. In one aspect of this disclosure, color values are obtained for two devices, such as two different printers, and used to generate an adapter that correlates the outputs of the two printers so that images with substantially identical colors, when viewed under standard conditions, can be printed on either. The color values for the two printers are generated from data obtained via colorimetric measurements.

It is well known that four-color printing systems are highly metameric compared with objects undergoing graphic reproduction. It has been found that the colorimetric analysis as described in U.S. Pat. No. 5,579,031 is insufficient to minimize the metamerism inherent in normal four-color printing.

Six-color printers have the potential to reduce metamerism by providing a better spectral match, but the computation in such systems is substantially more complicated.

Previously, ink sets with more than four colors have been employed with the goal of gamut expansion, not metamerism minimization. The present invention provides a method to fully utilize the spectral gamut of a six-color printer to minimize metameric matches while maintaining high colorimetric accuracy.

SUMMARY OF THE INVENTION

In accordance with the present invention, there is provided a method of printing a reproduced image with an output printer with six-color output, wherein the reproduced printed image is a spectral and colorimetric match of a target image as would be printed with a target printer or other target color device, and wherein the target printer and the output printer are different, comprising the steps of:

(1) building a six-color spectral printer model of the six-color output printer based on spectral measurements of the output of the six-color output printer;

(2) obtaining a color spectrum of the target color device based on spectral measurements of the output of the target color device;

(3) fitting the color spectrum of the target printer to the spectral model of the output printer;

(4) mapping the target color device to the output printer based on the fitting, and (5) printing the second image on the output printer based on the mapping.

The output printer is preferably an ink jet printer. The target color device can be an inkjet printer, a dye sublimation/diffusion device, slide printers, a rotary screen printer, a CRT, flat panel displays, and other electronic displays.

The six-colors of the output printer are preferably cyan, magenta, yellow, black, orange and green (CMYKOG). Each of the six colors can be present as full strength or some combination of full and/or partial strength to assist in color gamut expansion, for example, cyan and light cyan, and magenta and light magenta (CcMmYKOG).

The term "a spectral and calorimetric match of a target image as would be printed with a target printer" is intended to be descriptive of an improved overall color match as opposed to just a calorimetric match. There is provided an optimized, but not necessarily perfect, match of spectral and colorimetric properties. In other words, the present process is designed for metamerism minimization in a typically highly metameric environment, so that the "reproduced" image more closely resembles, in all aspects and under all viewing conditions, the original image as it would appear when printed with a target printer.

For example, it is a goal of the present invention to be able to print an image with a six-color ink jet printer so that it has a substantially identical appearance with a minimum of metamerisms as compared to the same image when printed with a typical rotary screen printer. This would allow cost effective short run production of images using digital printing, which would otherwise be cost prohibitive in rotary screen printing due to the time and expense in cutting screens.

These and other features and advantages of the present invention will be more readily understood by those of ordinary skill in the art from a reading of the following detailed description. It is to be appreciated that certain features of the invention that are, for clarity, described above and below in the context of separate embodiments, may also be provided in combination in a single embodiment. Conversely, various features of the invention that, for brevity, described in the context of a single embodiment, may also be provided separately or in any sub-combination. In addition, references in the singular may also include the plural (for example, "a" and "an" may refer to one, or one or more) unless the context specifically states otherwise.

DETAILED DESCRIPTION OF THE PREFERRED EMBODIMENTS

Figure 1:
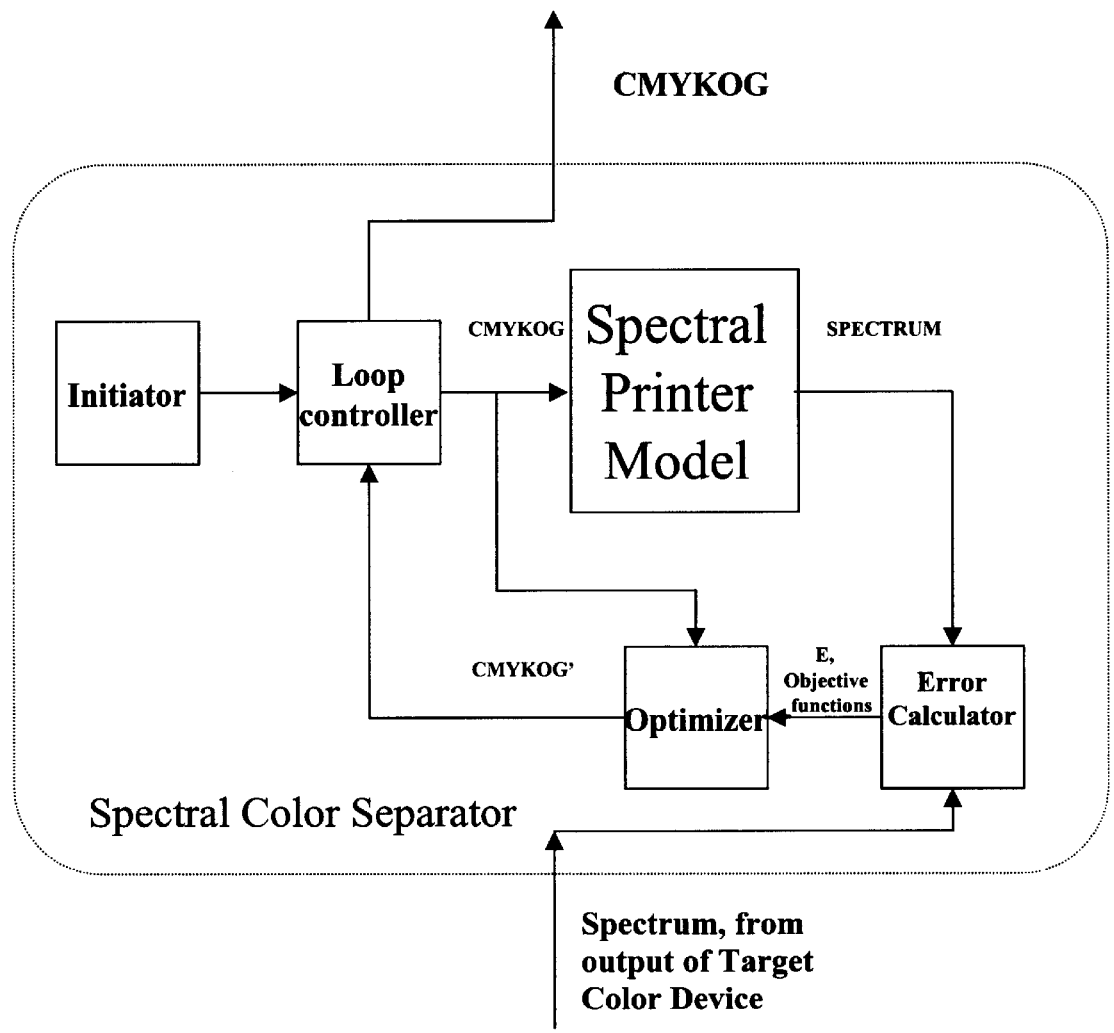
FIG. 1 is a flow chart illustrating an example method for a color reproduction device according to the invention.

As illustrated in FIG. 1 the invention has several steps.

1. Build the Spectral Printer Model.
2. Obtain a color spectrum from the target color device.
3. Fit the color spectrum of the target color device by the Inverse Spectral Model.
4. Map the target color device spectrum to the output printer based on the fitting.
5. Print the second image on the output printer based on the mapping.

Spectral Printer Model of the 6 Color Output Printer (The Forward Model)

Various color models were examined for application in the present invention. It was found that the preferred strategy is to use a Yule-Nielson modified spectral Neugebauer (YNSN) equation. This strategy provided the best accuracy with a manageable amount of input data. The YNSN equation and variations are well-known to those of ordinary skill in the art, see for example D. R. Wyble and R. S. Berns, "A Critical Review of Spectral Models Applied to Binary Color Printing," *Color Res. Appl.* 25, 4–19 (2000).

The YNSN and other relevant equations are defined in equations (1) to (3) for the general case of K inks under the Demichel constraints:

Equation (1)

$$\hat{R}_\lambda = \left( \sum_{i=1 \to 2^K} (w_i (R_{\lambda, i, \max}))^{1/n} \right)^n$$

Equation (2)

$$w_j = \prod_{j=1 \to k} \left( \begin{array}{l} \text{if ink } j \text{ is in Neugebauer Primary } i, \text{ then } a_j \\ \text{Else, } (1 - a_j) \end{array} \right)$$

Equation (3)

$$a_j = [R(d_j)^{1/n} - R_p^{1/n}]/[R_s^{1/n} - R_p^{1/n}]$$

wherein:

$\hat{R}_\lambda$ is the predicted spectral reflectance;

n is the empirically fit Yule-Nielson n-value accounting for physical and optical ink and media (e.g., paper or textile) interactions $R_{\lambda, i, \max}$ is the spectral reflectance of the $i^{th}$ Neugebauer primary;

$w_i$ is the Demichel weighting of the $i^{th}$ Neugebauer primary defined by the product of the effective area coverages, $a_j$, for each ink;

$a_j$ is the effective area for the color j;

$R_s$ is reflectance of a solid color;

$R_p$ is reflectance of the media (e.g., paper or textile);

$d_j$ is dot percent area for color j and is equal to $D_j/255$; and $D_j$ is the digital count scaled from 0–255.

In the case of six colors, K=6.

The Spectral Printer Model (output printer model, OPM) of a six-color output printer employing, for example, CMYKOG, can be built using the Yule-Nielson modified spectral Neugebauer (YNSN) equation as follows.

1. Print the sixty-four color patches representing the Neugebauer primaries and for each measure the reflectance spectrum, preferably from 400 to 700 nm at 10 nm intervals, using a spectrophotometer. These are the $R_{\lambda, i}$.

2. Print ramp images for each of the six printer primaries (CMYKOG) and measure the reflectance spectrum of each as above. These are $R(d_j)$. It is preferred to have 9 intervals with ⅛ of the maximum range (255/8) for each interval, but it is also quite common to have 11 intervals with ⅒ of the maximum range for each interval.

3. Build six lookup tables (LUTs) that map dot percent area ($d_j$) into effective area $a_j$ using equation 3 (Murray-Davies equation for a single color). For any given initial digital count in CMYKOG domain, the dot percent areas are obtained by dividing the digital count by 255. The effective areas are obtained directly from the six LUTs or by interpolation for points between the grid points.

4. Calculate the Demichel weightings using the effective areas.

5. Calculate the estimated spectrum for a given digital count from the YNSN formula, equation 1.

6. Print a set of color patches that represent the printer's color gamut; measure their reflectance spectrum; enter the six-color values of these color patches into the printer model; compare the predicted spectrum with the true spectrum; find the value of n that minimizes the matching error.

Using the OPM, any color within the gamut of the printer, i.e., any combination of CMYKOG, can now be described spectrally.

Fitting a Target Printer Color (The Inverse Model)

For reproduction of a target color by the output printer, the target color devices' output spectrum is measured by an appropriate spectral measuring device. This spectrum is designated the target spectrum. For instance, if the target color device is an inkjet printer a spectrophotometer may be used. The target spectrum is fit to the OPM so as to find the best combination of output printer colors to match the spectrum of the target color.

The process of fitting the target color to the OPM can occur as depicted in FIG. 1.

The Initiator creates a set of initial values, which are passed to the Loop Controller. These values, starting CMYKOG in this case, are used to create a "guess" of the target values (target spectrum) through the printer model. The error between the "guess" and the actual target values is then used to derive a correction, which will minimize the error. Proper selection of initial values will speed up the optimization process and assure conversion (zero matching error). Some strategies which were found useful were setting the initial values all to either 10% or 90%. Thus, selecting 10%, for example, the initial values of CMYKOG are all set to 26 (that is 10% of the maximum digital count, 255, rounded to the closest integer).

The Loop Controller during this first iteration passes the initial values on to the OPM that calculates a predicted spectrum.

The spectrum from the target color device and the predicted spectrum from the OPM are sent to the error calculator. The error for a given calculation of color difference could be RMS, a ΔE 94, maximum ΔE 94 or a combination of these and other color difference formulations. To optimize utilizing ΔE 94 in the error the spectrum is transformed into CIELAB color space to obtain the ΔE 94, conventional transformation. The preferred optimization strategy uses RMS error to minimize the metameric effects followed by minimization of mean ΔE 94. The definition of these terms have been developed by the International Commission on Illumination (CIE). They are also described in *Billmever and Saltzman's Principles of Color Technology*, R. S. Berns, John Wiley, New York, 2000 (incorporated by reference).

The object function is sent to the optimizer where an algorithm for constrained optimization is applied to adjust the six-color values and minimize the objective function. The optimizing algorithm can be any suitable algorithm such as Sequential Quadratic Programming (SQP), see for example W. Hock, and K. Schittowski, "A Comparative Performance Evaluation of 27 nonlinear Programming Codes", *Computing*, Vol.30, pp. 335, 1983; the Davidson-Fletcher-Powell (DFP) algorithm, see for example Brent, Richard P., *Algorithms for Minimization without Derivatives*, Prentice-Hall, 1973; and the like.

The process is repeated until convergence is reached. When a match is reached for given criteria, the loop controller stops the iteration and the final six-color values become the output.

Mapping the Target Color Device to the Output Printer

The output from the fitting of the target color device colors can be used to map the target color device to the output printer. This can take the form of a LUT that maps the target device to the output device such that the printer color of the output device will match the color of the target device or, in simple cases can be a function calculated on the fly.

In one preferred embodiment, the target printer is a screen printer, preferably a rotary screen printer for textile printing. In this case, the colors for the screen separations constitute the target printer colors which are fit and mapped to the output printer as described herein before. In this way, the image printed by the output printer will spectrally match the image printed by the screen printer.

In another preferred embodiment, the target printer is a graphic art printing press, for example a six-color printing press, and the output ink jet printer is used as a proofer. In this case, a target printer model (TPM) is created in the same way as the OPM herein before described. The TPM is then fit and mapped to the OPM creating a LUT which links the target printer's domain to the output printer's domain. Using this LUT, the desired graphics arts printing press image can be printed on the ink jet proofer with good metameric match.

In general, the target color image to be reproduced is in the form of a computer file that is read into a computer. The digital counts prescribed by that file are mapped to the output printer according to the instant invention and the image is printed on the output printer with the result that the reproduced image is an optimized metameric and colorimetric match of the original.

EXAMPLE

An Epson Stylus Photo 1200 printer was used with the light magenta and light cyan inks of the printer being replaced by the orange and green inks from a Roland Hi-Fi Jet printer.

A Spectral Printer Model was developed for this printer by following step 1 through step 6 shown for the Spectral Printer Model above. Thus, the forward model of the printer was built. At steps 1 and 2 the spectrophotometer used was a GretagMacbeth Spectrolino spectrophotometer, which had a 4 mm aperture with a 45°/0° ring optic geometry and measured from 380 to 730 nm in 10 nm steps. After fitting, the n in the Yule-Nielson modified spectral Neugebauer equation was 6.

Using the same modified Epson printer as the target color device and following the procedure described above, the inverse model of the target printer was then fit.

Three sets of target color samples were created for testing:
 a. a test pattern containing 384 random samples of six-ink combinations constrained to 300% maximum area coverage
 b. a GretagMacbeth ColorChecker and
 c. object colors compiled by Vrhel, et al, *Color Res. and Appl.*, 19(1), 4 (1994).

The first sample tested the accuracy of the forward model. The samples were printed and measured spectrally. The sample digital counts were run through the Spectral Printer Model. The measured spectra were then fit with the interactive nonlinear optimization and the resulting digital counts were reprinted and measured. A summary of the calorimetric and metameric performance of the system is presented in Table 1. The Metameric Index (MI) in the table was based on a parametric approach such that a perfect match is achieved for illuminant D65. (Fairman, H R, *Color Res. and Appl.*, 12, 261 (1987)). The MI was a $\Delta E$ 94 calculated for illuminant A and the 1931 standard observer. Because the 384 samples of the random target were printed by the same printer that was used to generate the forward model, its color is within gamut and non-metameric, and the test result is used to indicate model precision

TABLE 1

Colorimetric and Metameric comparison of 384 random printed color sample spectra

| Spectral Comparison | delta E 94, 2 degree obs. III.D65 | | | Metameric Index (III. A) | | | Spectral RMS |
|---|---|---|---|---|---|---|---|
| | Mean | Std Dev | Max | Mean | Std Dev | Max | |
| Forward Model Error | 1.3 | 0.8 | 6.4 | 0.2 | 0.2 | 1.3 | 0.012 |
| Estimated Performance | 0.3 | 0.4 | 5.1 | 0.1 | 0.1 | 0.4 | 0.006 |
| Estimation error | 1.0 | 0.4 | 3.2 | 0.2 | 0.1 | 0.6 | 0.009 |
| end-to-end performance | 0.9 | 0.5 | 5.4 | 0.1 | 0.1 | 0.7 | 0.008 |

The target color samples based on the GretagMacbeth Color Checker and 170 object colors compiled by Vrhel were evaluated to test how the system might perform in a complete imaging system.

The ColorChecker and Vrhel datasets contain samples that are metameric and out of gamut. They are used to test the prediction accuracy of the model. Both datasets were run through the inverse models, printed and measured. The colorimetric and metameric performance is summarized in Table II.

TABLE 2

Colorimetric and Metameric Performance for Color Checker and Vrhel Data

| Sample Set | delta E 94, 2 degree obs. III.D65 | | | Metameric Index (III. A) | | | Spectral RMS |
|---|---|---|---|---|---|---|---|
| | Mean | Std Dev | Max | Mean | Std Dev | Max | |
| ColorChecker Predicted | 2.3 | 2.0 | 7.2 | 0.6 | 0.6 | 2.1 | 0.031 |
| ColorChecker Printed | 2.6 | 1.9 | 6.7 | 0.6 | 0.5 | 2.0 | 0.033 |
| Vrhel Predicted | 2.9 | 3.0 | 15.9 | 0.6 | 0.6 | 3.3 | 0.032 |
| Vrhel Printed | 3.2 | 3.0 | 15.2 | 0.6 | 0.5 | 3.1 | 0.035 |

The results in all three cases show to have metameric indexes less than 1 that are considered very good.

What is claimed is:

1. A method of printing a reproduced image with an output printer with six-color output, wherein the reproduced image is a spectral and colorimetric match of a target image as from a target color device and wherein the target color device and the output printer are different, comprising the steps of:

(1) building a six-color spectral printer model of the six-color output printer based on spectral measurements of the output of the six-color output printer;

(2) obtaining a color spectrum of the target color device based on spectral measurements of the output of the target color device;

(3) fitting the color spectrum of the target color device to the spectral model of the output printer;

(4) mapping the target color device to the output printer based on the fitting, and (5) printing the reproduced image on the output printer based on the mapping.

2. The method of claim 1, wherein the target color device is a color printer.

3. The method of claim 1, wherein the target color device is a rotary screen printer.

4. The method of claim 3, wherein the output printer is an ink jet printer.

5. The method of claim 4, wherein the six-color spectral printer model is built using a Yule-Nielson modified spectral Neugebauer equation.

6. The method of to claim 1, wherein the output printer is an ink jet printer.

7. The method of claim 1, wherein the six-color spectral printer model is built using a Yule-Nielson modified spectral Neugebauer equation.

* * * * *